Jan. 30, 1962　　　D. P. ADAMS　　　3,018,552
NOMOGRAPHIC INSTRUMENTS
Filed March 29, 1957　　　2 Sheets-Sheet 1
Fig. 1
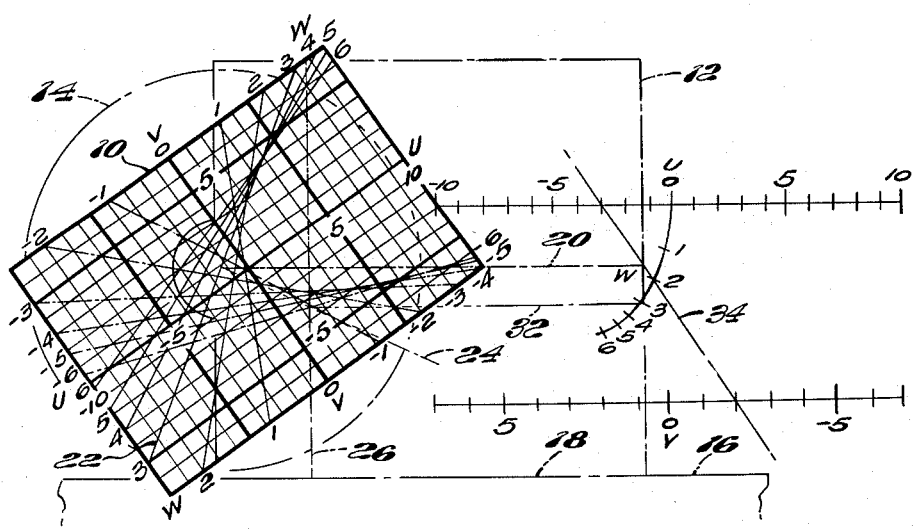
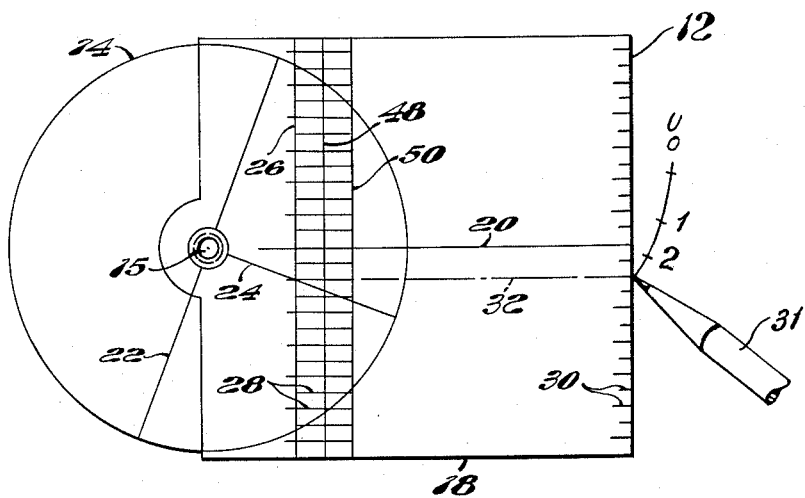
Fig. 2
INVENTOR.
DOUGLAS P. ADAMS
BY
Edward W Fearing

United States Patent Office 3,018,552
Patented Jan. 30, 1962

3,018,552
NOMOGRAPHIC INSTRUMENTS
Douglas P. Adams, 6 Bellevue Ave., Cambridge, Mass.
Filed Mar. 29, 1957, Ser. No. 649,445
9 Claims. (Cl. 33—1)

This invention relates generally to nomographic instruments and more particularly to devices for translating network charts into alignment diagrams by the line to point method.

Methods of constructing alignment diagrams from network charts which either express mathematical relationships or which are based upon empirically derived data are already well known to those skilled in the art. However, these methods of construction require considerable skill and are susceptible to cumulative errors which undesirably render the results less reliable and accurate than necessary. Not only is considerable skill required but these constructions are time consuming thus adding substantially to their cost of preparation.

An object of the present invention is accordingly to provide an instrument by means of which alignment diagrams may be produced with greater accuracy than has heretofore been possible. Another object is to provide a device which may be employed for constructing alignment diagrams by the line to point method with greater speed and at the same time with greater accuracy than has heretofore been possible. Still another object is to provide an instrument, which, because of its simplicity, may be employed with skill by persons having limited training.

The foregoing objects are achieved in a nomographic instrument embodying the present invention, which instrument comprises a flat base member having a horizontal edge for sliding engagement with a rectilinear guide supported on a plane surface and a disc, rotatably mounted on the base member, having scribed on one of its surfaces a diametric scanner line which is registrable successively with the characteristics, ordinates or abscissas of a network chart to be translated into an alignment diagram and a radial index line which intersects a line scribed on the base member normal to the horizontal edge, the intersection defining a point of the alignment diagram corresponding to the characteristics, abscissa or ordinate of the network chart. For greater convenience, according to a feature of the invention, means is incorporated in the instrument for directing the location outside the base of a point corresponding to that defined by the intersection of the two lines.

The invention also includes certain novel constructions and refinements which will hereinafter be described and claimed, the advantages of which will be apparent to those skilled in the art from the following description, taken in connection with the accompanying drawings, in which:

FIG. 1 is a diagrammatic view of a network chart in the process of being translated into an alignment diagram by means of a nomographic instrument embodying the invention and shown in phantom;

FIG. 2 is a view looking down upon an instrument similar to that shown in phantom in FIG. 1 but including additional details of construction;

Figures 3, 6:
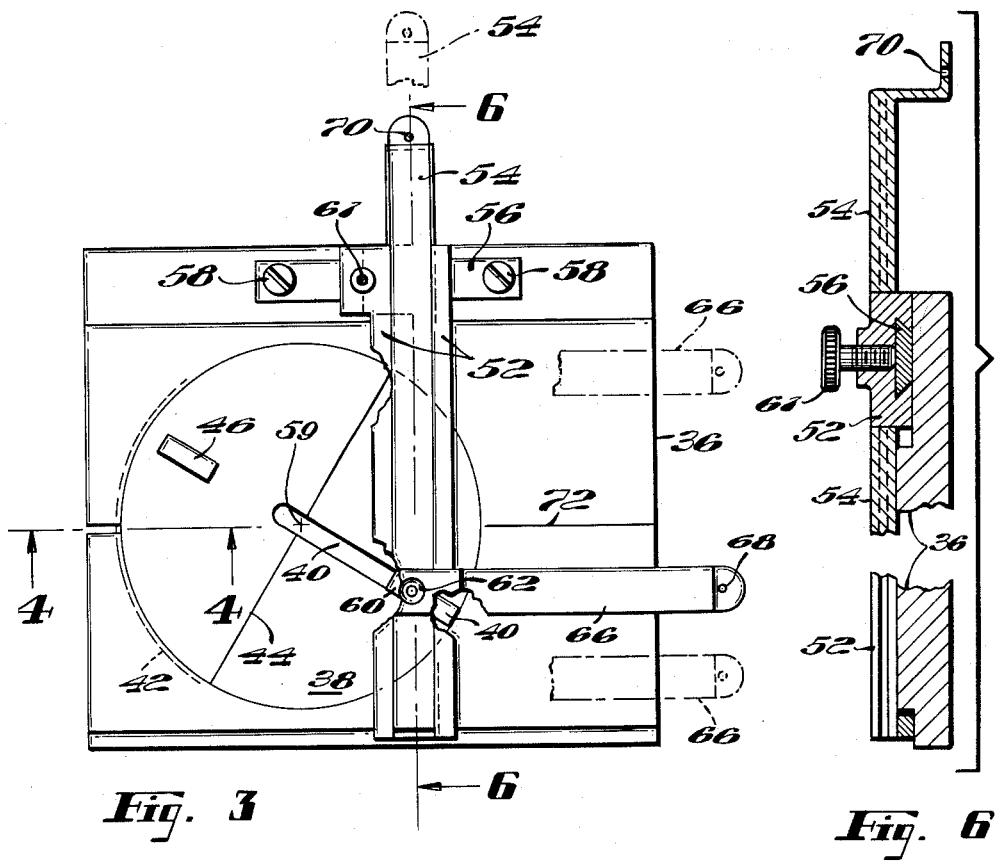
FIG. 3 is a plan view of a modified form of the instrument shown in FIG. 2.
FIG. 6 is a sectional view taken along the line 6—6 of FIG. 3 and showing the means for positioning the slide at a variable distance from the axis of the disc.

Although instruments according to the present invention are useful for translating into alignment diagrams network charts having other than linear characteristics, the use of the instrument is most clearly shown as in FIG. 1 with reference to a network chart indicated at 10. The network chart 10 has a family of graphs or curves on Cartesian coordinates of the equation $$W^2 - 2VW + 4U = 0$$

for values of U between 10 and −10 and values of V between 7 and −7, showing resultant values of W from 1 to 6 as a series of full straight lines. The network chart also includes values of W between −1 and −6 shown as a series of dot and dash lines but for purposes of the present example only the positive values of W will be considered. The manner of plotting the present equation or graphs derived from empirical data in the form of network charts is well known and will therefore not be described further.

The novel instrument shown in FIGS. 1 and 2 comprises a flat transparent plastic base 12 and a flat transparent plastic scanner disc 14 rotatably mounted by means of a tubular rivet 15 having a fixed axis concentric with the disc on the base. During use, the instrument is supported on an underlying plane surface, having drawing paper or other film, which also supports a horizontal straight edge, indicated at 16. As a first step in employing the instrument for translation, the network chart is fixed upon the plane surface and the straight edge is arranged in parallel relation with one diagonal of the network chart, so arranged that when the base 12 is moved with its lower edge 18 in sliding engagement with the straight edge the axis of the disc travels along the diagonal of the network chart. For assisting in the relative positioning of the instrument and the straight edge 18 on the network chart, a horizontal line 20 is scribed on the underside of the base member. The instrument and the straight edge are moved vertically together until the line 20 intersects two diagonal corners of the chart, the chart being turned slightly during this procedure, if necessary. The network chart and the straight edge are then fixedly secured in place on the supporting surface and are not moved thereafter until completion of the translating operation.

For translating the characteristics of the network chart into an alignment diagram, a diametric scanner line 22 is scribed on the underside of the disc, which is preferably mounted beneath the base for reasons which will become apparent. A radial index line 24 is scribed on the topside of the disc normal to the scanner line and intersects a perpendicular or vertical line 26 scribed on the underside of the base member for defining a point corresponding to the angular orientation of the scanner line with respect to the edge 18.

In employing the instrument for constructing an alignment diagram from the network chart, the scanner line 22 is successively registered with the characteristic lines 1 to 6, inclusive, of the network chart which represents values of W between 1 and 6 by moving the base 12 along the straight edge 18 and rotating the disc 14 by the required amounts. As the scanner line is registered with each characteristic line of the network chart, the vertical height of the point defined by the intersection of the index line 24 with the vertical line 26 is measured by means of graduations, indicated at 28, and transferred to a point at one side of the base having an equal height along the right-hand edge of the base by means spaced horizontally from the intersections and composed of similar graduations 30 along the latter edge (see FIG. 2). The actual marking of the transferred point is accomplished by a stylus or pencil 31 at the reading on the graduations 30 corresponding to that defined by the intersection of the index line 24 with the vertical line 26. A line connecting the points thus transferred may then be drawn to define a locus for all the points corresponding to a range of any or all characteristic lines of the network chart.

In FIG. 1, the instrument is shown being employed for translating the line representing the value of $W=3$, the scanner line 22 in FIG. 2 being shown in the same angular position as that of FIG. 1 for clarity. A dot dash line 32 is illustrated in both FIGS. 1 and 2 to indicate the vertical height of a point defined by the intersection of the lines 24 and 26 when the scanner line registers with the line $W=3$ on the network chart. At this height the point corresponding to the line $W=3$ on the network chart may be marked by the pencil 31. The points in the alignment diagram corresponding to other values of W from 1 to 6 inclusive are similarly located by registering the scanner line 22 with the other corresponding characteristic lines of the network chart. When sufficient points are obtained on the alignment diagram a continuous curve W may be drawn by connecting them.

The network chart also includes scales which are graduated along their lengths for values of U and V respectively. The U and V scales are located and translated by registering the scanner line with the ordinates and the abscissas of the network chart, marking the corresponding points, and connecting them on the alignment diagram. Thus in the example of FIG. 1, the graduations of the U scale are translated by successively registering the scanner line 22, first with the line $U=-10$, then $U=-9$ and so on, to locate the corresponding points on the U scale of the alignment diagram. When all of the points have been located they are joined together to form the line U on the alignment diagram. Thereafter, those lines $-7$ to $+7$ of the V scale are similarly translated by registering the scanner line with the corresponding ordinate lines of the network chart. Since all abscissa lines are parallel the angular orientation of the disc is not changed in registering with successive abscissas, the vertical height remains constant as the instrument is moved along the straight edge and hence points in the alignment diagram corresponding to values of U lie in a straight line. The values of V are similarly translated to a graduated scale V in the alignment diagram.

Turning now to the alignment diagram constructed in FIG. 1, its values may be seen from a typical straight edge or line 34 which intersects values on the scales U and V and the curve W. If the values $U=-3$, $V=-2$ and $W=2$ are substituted in the original equation it will be seen that these values satisfy the conditions of the equation.

An instrument according to the invention but incorporating additional features for facilitating the translation of network charts into alignment diagrams is shown in FIGS. 3 to 7 inclusive and includes a flat transparent base 36 into which is rotatably mounted by peripheral bearing contact, a transparent disc 38. The base 36 is slotted at its left-hand edge for insertion of the disc which is also formed with a radial index slot, indicated a 40. The disc is mounted for rotation and is retained in the base by means of a peripheral tongue 42 fitted into a similarly shaped groove in the base, in such a way that the disc is retained by frictional engagement against accidental rotation. A diametric scanner line 44 to which the slot is normal is scribed on the underside of the disc and is employed in the same manner as the scanner line 22 of the instrument depicted in FIG. 2 for successively registering with the characteristic lines of a network chart being translated. An integral finger grip lug 46 is provided on the disc for rotating it to move the scanner line into registration with network chart characteristics. By mounting the disc 38 in a peripheral bearing parallax of the lines scribed on both the base 36 and the disc are avoided since there is no overlapping required and both are disposed with their bottom surfaces in direct contact with the network chart.

In the alignment diagram of FIG. 1, the U and V scales are equal in length to the diagonal of the network chart but the vertical distance between the two scales depends partly upon the horizontal distance between the line 26 and the center of rotation of the disc 14 formed by the rivet 15. As this horizontal distance is increased the vertical dimension or the distance between the U and V scale and the vertical distance between successive points defining the curve of values of W increase proportionately. It is an advantage in obtaining maximum accuracy in any alignment diagram to have the distances referred to as great as possible. For this reason, two additional lines, indicated at 48 and 50, are scribed on the lower surface of the base of the instrument in parallel relation with the line 26 as shown in FIG. 2. It will be appreciated that if the points of the alignment diagram are defined by intersections of the index line 24 with the line 48 instead of with the line 26 the U and V scales will lie farther apart as will also the points defining the curve W.

In order to provide maximum accuracy of the alignment diagram as already explained, the instrument shown in FIGS. 3 thru 7 is provided with a horizontally adjustable guideway 52 in which a perpendicular slide 54 is vertically movable. The guideway is slidably mounted on a horizontal cleat 56 of dove-tail section, which is in turn fixed to the base by screws 58. A thumb screw 61 is threaded into the guideway 52 and frictionally engages the top of the cleat for locking the guideway at a predetermined distance from the axis, indicated at 59, of the disc during the translation of a given network chart. The heads of the screws 58 which secure the cleat upon the base member overlie the cleat thus providing limits in both directions for the adjustment of the guideway. Horizontal shift of the guideway 52 on the cleat 56 affords adjustment of the vertical distances between the U and V scales of the alinement diagram without the use of additional vertical lines, such as 48 and 50 in FIG. 2.

Figures 4, 5:
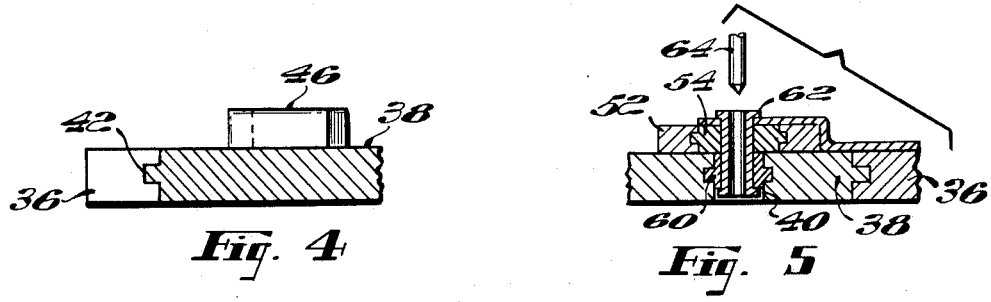
FIG. 4 is a view on an enlarged scale and in cross section taken along the line 4—4 of FIG. 3 showing the mounting of a disc on a base of the instrument.
FIG. 5 is a detailed view in section arranged to show the coupling between a vertical slide and the disc of the instrument.
Figure 7:
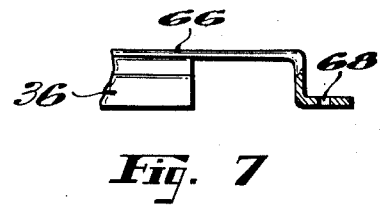
FIG. 7 is a fragmentary view looking toward the lower edge of the base of the instrument in FIG. 3 and showing a member carried by the slide.

In order to facilitate the translation of network charts, a feature of the invention relates to a mechanical connection between the disc 38 and the slide 54. As shown in FIGS. 3 and 5, the index means including the slot 40 has slidably mounted therein a block 60 which is coupled to the slide by means of a tubular rivet 62. The block 60 and the slide 54 are both formed with lateral tongues which slidably engage complementary grooves in the disc and guideway, respectively. By reason of the connection between the disc and the slide 54, thus described, the slide 54 moves upwardly as the disc 38 is rotated in a counterclockwise direction from the position shown in FIG. 3 and conversely the slide moves downwardly when the disc is rotated in a clockwise direction. The rivet 62 is formed with an axial opening into which a stylus 64, having a concentric point, is slidably received for forming indentations in the surface underlying the instrument, which indentations correspond to the angular orientation of network chart characteristics with which the scanner line 44 is registered.

Under circumstances when it is more convenient to construct the alignment diagram in an area more remote from the network chart than is possible by means of a stylus passing thru the rivet 62, horizontally spaced means are provided for marking corresponding points outside the base member. One such means comprises an arm 66 fixed to the top surface of the slide 54 and extending laterally therefrom. At its outward end, the arm 66 has a perforation 68 thru which the point of a pencil or stylus may be inserted for locating a point corresponding to the inclination of a network chart characteristic with which the scanner line 44 is registered. In FIG. 3 the uppermost and lowermost positions of the arm 66 are shown in dot and dash lines. The slide 54 is also formed with an opening 70 which may be similarly employed. It will be appreciated, however, that all the characteristics, abscissas and ordinates of a given network chart must be translated by employing the same point locating means.

An important advantage of the instruments already described is that by their use the possibility of introducing into the construction of alignment diagrams errors caused by parallax is substantially eliminated. Because the scanner line in each case is scribed in the underside of the disc which is in direct contact with the network chart, the possibility of error in registering the scanner line with a network chart characteristic is negligible. In the case of the instrument of FIG. 2 the index line 24 is scribed in the upper surface of the disc and the vertical lines 26, 48 and 50 are scribed in the underside of the base member 12 which is in surface contact with the top of the disc, thus eliminating the possibility of parallax error in locating the intersection of the index line with one of the vertical lines. The horizontal line 20 included in the instrument of FIGS. 1 and 2 and a similar line 72 in the device of FIG. 3 are scribed in the underside of the respective base members for minimizing error in orienting network charts to be translated. Finally, the graduations 28 and 30 are also formed on the underside of the base member, the graduations 30 being in direct contact with the supporting surface in order to reduce to a minimum errors in transferring points of intersection between the index line and the vertical line to points outside the base member.

From the foregoing description of instruments embodying the present invention and of the illustrative usage, variations will immediately be obvious to those having ordinary skill in the art. For example, the illustrative instrument is useful for constructing alignment diagrams from network charts in which the characteristics are not straight lines. When the characteristics consist of a series of curves, they may be translated by a technique known as "cross-firing" into a series of curves of an alignment diagram. The cross-firing technique consists in orienting the scanner line into a tangent position relative to the curve of the network chart at some random point near each end of the curve and at a number of random intermediate points depending upon the complexity of the curve, each said tangent position having a corresponding point in the alignment diagram. The points in the alignment diagram derived from one of the curves of the network chart in turn define a curve.

The nature and scope of the invention having been indicated and particular embodiments having been described, what is claimed is:

1. A nomographic instrumnet for translating a family of curves plotted against the ordinates and abscissas of a Cartesian diagram into an alignment diagram, comprising a flat base having a horizontal edge for sliding engagement with a rectilinear guide supported on an underlying plane surface, a transparent disc, means for mounting the disc for rotation about a concentric axis on the base, a diametric scanner line scribed on one surface of the disc and arranged to be registered successively with the curves, the ordinates and abscissas of the Cartesian diagram upon rotation of the disc and shift of the base along the rectilinear guide, index means on said disc normal to its scanner line, and a perpendicular on the base at a fixed distance from the rotational axis of the disc, in combination with means on the base for locating points on the underlying plane surface determined by intersections of the index means on the disc with the perpendicular on the base to define curves, each forming a locus for all points corresponding to the family of curves, and scales corresponding to the ordinates and abscissas of the Cartesian diagram.

2. A nomographic instrument for translating a network chart having a family of curves plotted against the ordinates and abscissas of a Cartesian diagram into an alignment diagram, comprising a flat base having a horizontal edge for sliding engagement with a rectilinear guide supported on an underlying plane surface, a transparent disc, means for mounting the disc for rotation on the base, a diametric scanner line scribed on the disc and arranged to be registred successivley with the curves and with the ordinates and abscissas of the Cartesian diagram upon rotation of the disc and shift of the base along the rectilinear guide, index means on said disc normal to its scanner line, and a perpendicular on the base, said perpendicular being located at a fixed distance from the rotational axis of the disc, in combination with means on the base for locating points on the underlying plane surface determined by intersections of the index means on the disc with the perpendicular on the base to define a curve forming locus for all points corresponding to the family of curves, and scales corresponding to the ordinates and abscissas of the Cartesian diagram, and means on the base spaced horizontally from the perpendicular for guiding the location of similarly spaced markings from said intersections to points outside the base of the instrument.

3. A nomographic instrument for translating a family of curves plotted against the ordinates and abscissas of a Cartesian diagram into an alignment diagram comprising a flat transparent base having a horizontal edge for sliding engagement with a rectilinear guide supported on an underlying plane surface, a transparent disc, means for mounting the disc for rotation on the base, a diametric scanner line scribed on the disc and arranged to be registered successively with the curves and with the ordinates and abscissas of the Cartesian diagram upon rotation of the disc and shift of the base along the rectilinear guide, a radial line scribed on the disc normal to the scanner line, and a perpendicular on the base, said perpendicular being at a fixed distance from the rotational axis of the disc, in combination with a line scribed on the base normal to the horizontal edge and positioned for locating points determined by intersections of the radial line with the line on the base to define a locus for all points corresponding to the family of curves, and scales corresponding to the ordinates and the abscissas of the Cartesian diagram by successively registering the scanner line with each curve, ordinate and abscissa, and a horizontal line scribed on the base member in alignment with the axis of the disc and parallel to the horizontal edge for initially positioning the instrument on the Cartesian diagram.

4. A nomographic instrument for translating a family of curves plotted against the ordinates and abscissas of a Cartesian diagram into an alignment diagram, comprising a flat base having a horizontal edge, a transparent disc, means for mounting the disc for rotation about a concentric axis on the base, a diametric scanner line on the disc, a slide on the base movable along a path perpendicular to the horizontal edge and means connecting said disc to the slide for vertically positioning the slide in accordance with the angular orientation of the scanner line with respect to the horizontal edge to define a point on the alignment diagram corresponding to each one of the family of curves and scales corresponding to each ordinate and abscissa of the Cartesian diagram.

5. A nomographic instrument for translating a family of curves plotted against the ordinates and abscissas of a Cartesian diagram into an alignment diagram, comprising a flat base having a horizontal edge, a transparent disc, means for mounting the disc for rotation about a concentric axis on the base, a diametric scanner line scribed on the disc and arranged to be registered with the curves, the ordinates and the abscissas of the Cartesian diagram, a slide on the base movable along a path perpendicular to the slide for vertically positioning the slide in accordance with the angular orientation of the scanner line with respect to the horizontal edge, and an arm fixed at one of its ends upon the slide and having a point locating opening in its other end for guiding the marking of a point on the alignment diagram corresponding to each one of the family of curves and to scales corresponding to the ordinates and abscissas of the Cartesian diagram.

6. A nomographic instrument for translating a family of curves plotted against the ordinates and abscissas of a Cartesian diagram into an alignment diagram, comprising a flat base having a horizontal edge, a transparent disc, means for mounting the disc for rotation about a concentric axis on the base, a diametric scanner line scribed on the disc, a slide on the base movable along a path perpendicular to the horizontal edge, and means connecting said disc to the slide for vertically positioning the slide in accordance with the angular orientation of the scanner line with respect to the horizontal edge to define a point on the alignment diagram corresponding to each one of the family of curves and to scales corresponding to the ordinates and abscissas of the Cartesian diagram, and a horizontal line scribed on the base in alignment with the axis of the disc and parallel to the horizontal edge of the base for initially positioning the instrument on the Cartesian diagram.

7. A nomographic instrument for translating a family of curves plotted against the ordinates and abscissas of a Cartesian diagram into an alignment diagram, comprising a flat base having a horizontal edge, a transparent disc, means for mounting the disc for rotation about a concentric axis on the base, a diametric scanner line scribed on one of the surfaces of the disc, a guideway on the base perpendicular to the horizontal edge and positionable horizontally with relation to the axis of rotation of the disc, a slide movable in the guideway, and means connecting said disc to the slide for vertically positioning the slide in accordance with the angular orientation of the scanner line with respect to the horizontal edge on the base to define points on the alignment diagram corresponding to the family of curves and scales corresponding to the ordinates and abscissas of the Cartesian diagram.

8. A nomographic instrument for translating a family of curves plotted against the ordinates and abscissas of a Cartesian diagram into an alignment diagram, comprising a flat base having a horizontal edge for sliding engagement with a rectilinear guide supported on an underlying plane surface, a slide on the base perpendicular to the horizontal edge, a transparent disc, means for mounting the disc for rotation about a concentric axis on the base, and a diametric scanner line scribed on said disc and arranged to be registered successively with the curves, the ordinates and abscissas of the Cartesian diagram upon rotation of the disc and shift of the base along the rectilinear guide, and index means in the disc normal to the scanner line thereon, in combination with a mechanical connection between the slide and the index means on the disc for locating points on the underlying surface to define a curve forming a locus of all points corresponding to each curve and scales corresponding to the ordinates and abscissas of the Cartesian diagram, means for guiding the location of markings spaced similarly to the curve and scales defined on the underlying surface but spaced outside the base of the instrument, and means for mounting the perpendicular slide shiftably on the base at any of several different distances horizontally from the axis of the disc to afford adjustment in the vertical dimensions of the alignment diagram.

9. A nomographic instrument for translating into an alignment diagram a family of curves plotted against the ordinates and abscissas of a Cartesian diagram comprising a flat base having a horizontal edge, a transparent disc, means for mounting the disc for rotation on said base, a diametric scanner line scribed on the disc, a guideway on the base perpendicular to the horizontal edge, a slide movable in said guideway, means connecting said disc to the slide for vertically positioning the slide in accordance with the angular orientation of the scanner line with respect to the horizontal edge of the base to define points on the alignment diagram corresponding to the curves and to define scales corresponding to the ordinates and abscissas of the Cartesian diagram, and a cleat on the base along which the guideway is shiftable to afford adjustment of the vertical dimensions of the alignment diagram.

References Cited in the file of this patent

UNITED STATES PATENTS

| | | |
|---|---|---|
| 1,861,192 | Sander | May 31, 1932 |
| 1,864,576 | Bauersfeld | June 28, 1932 |

OTHER REFERENCES

Pages 20, 21, 28 and 29 of "Graphical and Mechanical Computation," by Joseph Lipka, published in 1918 by Johns Wiley & Sons, Inc., New York.